INVENTORS
HIROSHI KATAGIRI, TSUYOSHI KONNO
BY Stevens, Davis, Miller & Mosher
ATTORNEYS

SINUSOIDAL TIME BASE SYSTEMS

Filed Nov. 20, 1967

INVENTORS
HIROSHI KATAGIRI, TSUYOSHI KONNO
BY Stevens, Davis, Miller & Mosher
ATTORNEYS INVENTORS
HIROSHI KATAGIRI, TSUYOSHI KONNO
BY Stevens, Davis, Miller & Mosher
ATTORNEYS

United States Patent Office 3,439,220

Patented Apr. 15, 1969

3,439,220

SINUSOIDAL TIME BASE SYSTEMS

Hiroshi Katagiri and Suyoshi Konno, Kawasaki-shi, Japan, assignors to Matsushita Electric Industrial Co., Ltd., Osaka, Japan, a corporation of Japan Filed Nov. 20, 1967, Ser. No. 684,343

Claims priority, application Japan, Dec. 2, 1966, 41/79,466

Int. Cl. H01j *29/70*

U.S. Cl. 315—26 9 Claims

ABSTRACT OF THE DISCLOSURE

A time axis sweep system for generating sweep voltages to be applied to the deflection plates of an ultra wide bandwidth cathode ray tube. A pair of resonant circuits are alternately triggered so as to be in phase opposition, thereby developing a pair of balanced sinusoidal sweep voltages without the use of an inverter or amplifiers.

This invention relates to time base systems for cathode ray tubes, particularly to systems whereby a portion of the wave-form of a sinusoidal voltage generated in synchronization with the input signal is utilized as the time base voltage and whereby a pair of voltages which are mutually reverse in the phase are supplied as the time base voltage.

In conventional time base systems which comprise such a circuit as a so-called bootstrap circuit or Miller's integrator, the sweep voltage whose instantaneous value rises or falls linearly at a constant rate is obtained by maintaining the current charging or discharging a capacitor at a constant value. Accordingly, in such systems, it is required for varying the sweep speed, that is the rate of voltage variation, to vary either the capacitance of the capacitor or the value of the charging or discharging current. The sweep voltage obtained is amplified through an amplifier and then supplied to the defecting system after being converted to a pair of phasicly reversed voltages through a phase inverter circuit.

Recent developments in the field of cathode ray tubes (hereafter referred to as CRT) which have realized the display of an extremely fast phenomenon corresponding to a several thousands mega cycles band width, have raised demand for a more satisfactory system for the high speed horizontal sweep. To meet this demand, according to the conventional methods, it is necessary that a saw-tooth voltage having a steep rise is supplied to the deflecting system through a phase inverter circuit. As mentioned above, in order to obtain a steep saw-tooth voltage, the capacitance of the capacitor is required to be sufficiently small. However, this cannot be as small as required because of the stray capacitance existing between electrodes of vacuum tubes, between lead wires and in other parts of the circuit. On the other hand, the circuits in which the saw-tooth voltage is amplified and inverted, demand a wide band frequency characteristics and operate in the high voltage signal level. If the above-mentioned requirements are not fulfilled, the sweep voltage will be distorted, resulting in an unsatisfactory time sweep.

Some other sweep circuits have been proposed using sinusoidal voltage instead of saw-tooth voltage. Though the sinusoidal sweep is effective for ultra-high speed sweep, it is the same as the saw-tooth sweep in the problems encountered in the circuits in which the time base voltage generated is processed, that is, amplified and inverted. To avoid these problems, in the known art, the sweep signal generator is designed to produce a large enough output to make the amplifier unnecessary, that is, to allow the output of the sweep generator to be connected directly to the deflecting plate of CRT without an amplifier or a phase inverter circuit. However, this arrangement, with one of the deflecting plates grounded and the other imposed with a widely changing potential, produces undesirable effects, to cause various troubles in the observation of wave-forms on the CRT screen. It should be noted that a pair of balanced sweep-voltages must be applied to the set of deflecting plates, in order to ensure satisfactory beam focusing and no undesirable effect to the vertical excursion of the beams.

This invention has overcome the above-described disadvantages by positively exploiting the features of the sinusoidal sweep to apply a sweep voltage to each of the deflecting plates in mutually opposed relation in the phase.

According to one embodiment of this invention, as will be described in detail hereinafter, each of the deflecting plates of a CRT is connected to each output terminal of two sets of sinusoidal sweep voltage generators to which positive-pulses are supplied as input. Each set of input pulses applied to each sweep generator is timed in relation to the other set of input pulses, so as to cause the two sweep generators to produce two sinusoidal outputs 180° out of phase from each other. Further, the outputs of the sweep voltage generators are large enough to permit the generators to be connected directly to the deflecting plates. Thus, it will be seen that the above-mentioned problems are all solved.

Now, this invention will be described more in detail, with reference to the attached drawing, in which.

Figure 1A:
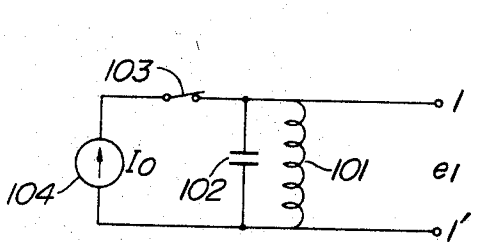
FIG. 1A is a connection diagram for explaining the principle of this invention.

Firstly, the principle of generation of a sinusoidal sweep voltage and synchronization of the sweep voltage with the vertical input signal of a CRT to be observed is explained hereunder as a preliminary step of the description, though it is well known in the art. In FIG. 1A which shows a principle of this invention, a coil 101 is connected with a capacitor 102 in parallel, the inductance of the coil being represented by $L_o$ and the capacitance of the capacitor $C_o$. The coil 101 is normally energized with the current $I_o$ which is supplied from the current source 104 through the switch 103. Upon opening the switch 103 at a certain instant $t_o$, a sinusoidal oscillation occurs in the circuit consisting of the coil 101 and the capacitor 102, the initial current being $I_o$ in the coil 101. This oscillation is represented by the following Formulas 1, assuming that the elements in the circuit produce no loss.

$$e_1 = -L_o\omega_o I_o \sin \omega_o t$$

$$\omega_o = 1/\sqrt{L_o C_o} \qquad (1)$$

Figure 1B:
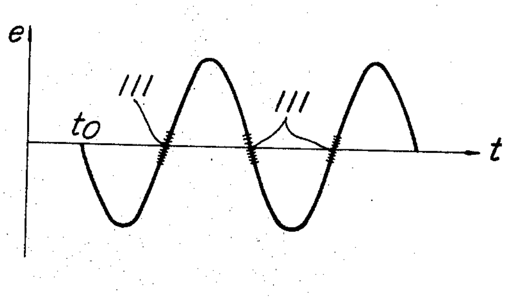
FIGS. 1B and 1C are diagrams for explaining the operation of the circuit shown in FIG. 1A.

FIG. 1B shows the wave-form of this oscillation. The steepest and most linear portions in this wave-form, i.e.

the portions in the vicinity of the zero axis as indicated by numeral 111 in the figure, can be used as high speed sweep voltage. Further, the synchronization of the sweep can be attained by opening the switch 103 by a signal synchronized with the signal to be observed on the CRT screen. In the above explanation, the energy loss in the circuit elements has been neglected. If the loss should be taken into consideration, then the oscillation in the same circuit is expressed by the following Formula 2.

$$e_1 = -L_o\omega_o I_o \exp\left(\frac{-\omega_o}{2Q}t\right) \sin \omega_o t \sqrt{1-1/4Q^2} \quad (2)$$

Figure 1C:
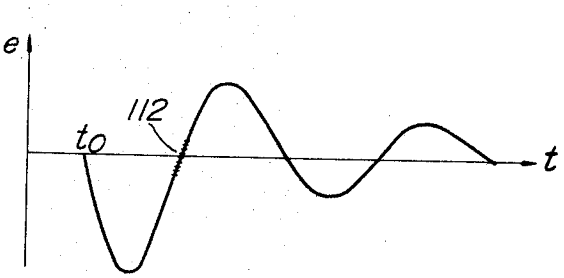

(where Q represents the quality factor of the circuit). FIG. 1C shows the wave-form of such oscillation. Since the inclination of the locus against the zero line in the vicinity thereof decreases with every zero crossing of the locus; strictly speaking, only one sweep is satisfactory upon each opening of the switch 103, for example, as the first zero crossing portion 112 in FIG. 1C. The terminals 1 and 1' in FIG. 1A are connected to the deflecting plates of CRT to supply the sweep voltage thereto.

Figure 1D:
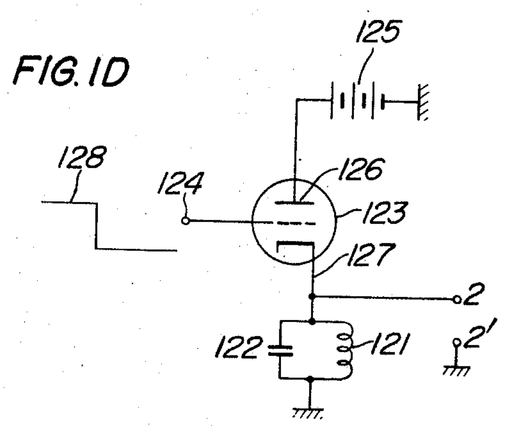
FIG. 1D is a connection diagram of a sweep voltage generator designed on the basis of the principle of FIG. 1A.

In FIG. 1D which shows a circuit composed according to the above-described principle, the plate 126 of a vacuum tube 123 is connected to the source 125, and the cathode 127 is connected to a parallel resonance circuit consisting of coil 121 and capacitor 122. The vacuum tube 123 is normally conductive to energize the coil 121, the bias voltage of the grid 124 being properly adjusted (the bias circuit is not shown). Upon applying a negative-going step voltage 128 to the grid 124 in synchronization with the vertical signal to be observed, the vacuum tube 123 becomes non-conductive and a damped sinusoidal oscillation is started in the resonance circuit of the coil 121 and the capacitor 122, thus to drive the deflecting plates of the CRT connected to the output terminals 2 and 2'.

With this type of circuit, however, the sweep system can not dispense with the phase inverter circuit, though the amplifier following the sweep generator may be eliminated. And, it is extremely difficult to provide a satisfactory phase inverter circuit for use with such sweep system in which the sinusoidal signal is suddenly generated, as described hereinbefore in connection with FIG. 1. Distortion of the sweep wave-form in transition, time delay in the phase and other similar defects in the sweep voltage are fatal especially in an extremely-high-speed sweep such as 0.1 ns./cm. (or $0.1\times10^{-9}$ sec./cm.).

Figure 2:
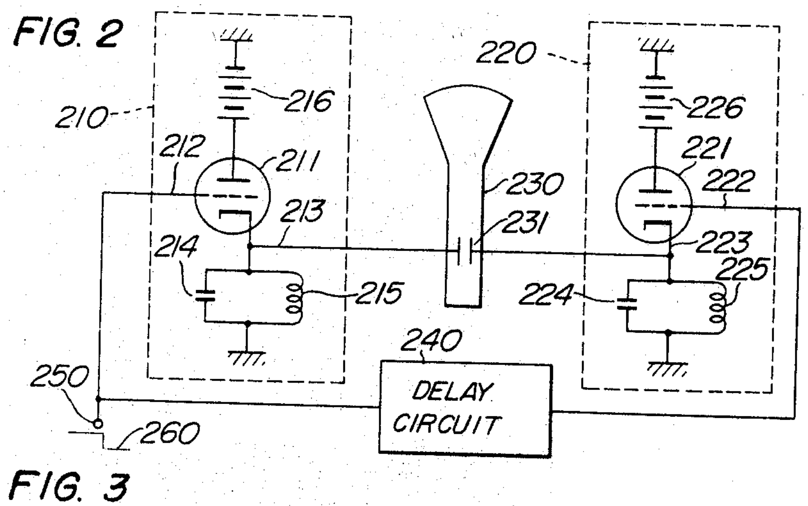
FIG. 2 is a connection diagram of an embodiment of this invention.
Figure 3:
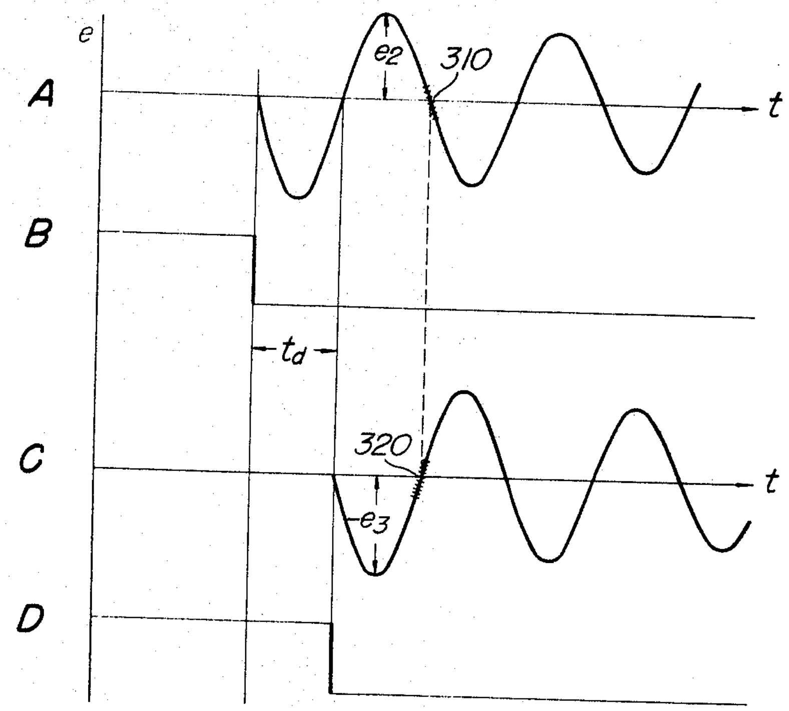
FIG. 3 is a diagram illustrating wave-forms in connection with the operation of the circuit shown in FIG. 2.

This invention has solved the above-mentioned difficulties by means described hereinafter. FIG. 2 shows an embodiment of this invention, which includes the same circuits as shown in FIG. 1D. It will be seen that only the essential circuit elements are shown in the drawing for simplicity. FIG. 3 shows the wave-forms of signals in the system and the relation of their timing. It is assumed that the constants of the circuit elements are the same as those in FIG. 1D. The vacuum tubes 211 and 221 are normally conductive. The sinusoidal sweep outputs are initiated when a negative-going step voltage 260 is applied to each of the grid electrodes 212 and 222. As each of the deflecting plates 231 of the CRT 230 is connected to the respective cathode 213, 223 of the vacuum tube 211, 221, the sinusoidal signals generated in the resonance circuits are applied directly to the deflecting plates 231.

As described hereinafter, the system is arranged so that the damped sinusoidal oscillation generated in the circuit 210 is 180° (a half cycle) ahead of the similar oscillation in the circuit 220. In FIG. 3 which shows the wave-forms of the signal, the loci A and C indicate the voltages at the cathodes 213 and 223 in the circuits 210 and 220, respectively, and the loci B and D show the input step voltages applied to the grids 212 and 222, respectively. The difference of the phase between the damped oscillations in the circuits 210 and 220, as mentioned above and shown in FIG. 3, is made in the manner that will be described hereunder.

Namely, the negative-going step voltage 260 applied to the input terminal 250 is given directly to the grid 212 of the vacuum tube 211 in the circuit 210 by one route. At the same time, however, the step voltage 260 also is given to the grid 222 of the vacuum tube 221 in the circuit 220, by another route, through the delay circuit 240 where the step signal is delayed an appropriate period $t_d$. This delay time $t_d$ is selected so that the phases of the damped oscillations generated in said two resonance circuits are 180° different from each other, as shown in FIG. 3.

The delay circuit 240 may be constituted from the well known mono-stable multi-vibrator or from a required length of the co-axial delay line.

By way of example, the constants of the circuit elements to give a sweep rate of 0.5 ns./cm. for a CRT whose horizontal deflection sensitivity is 30 v./cm., are shown as follows:

| | | |
|---|---|---|
| Capacitance of the capacitor **214** or **224** (including all parasitic capacitance) | pf | 15 |
| Inductance of the coil **215** or **225** | μh | 83.4 |
| Current normally fed to the coil | ma | 450 |
| Resonance frequency of the resonance circuits | mc | 4.5 |
| Delay time in the delay circuit **240**, approximate | ns | 110 |

In the above described system, a damping oscillation generated in the resonance circuit is utilized to produce the sweep voltage, as already explained. Accordingly, the inclination of the voltage excursion in the vicinity of the zero axis which part is to be used as the time base voltage, is ever decreasing with every succeeding zero crossing. Therefore, strictly speaking, the sweep voltages successively supplied to the deflecting plates are not the same in the inclination. For example, as obvious from the comparison of two approximately linear portions 310 and 320 of two wave-forms shown in FIG. 3, the zero cross portion 310 of the voltage locus which occurs one cycle after the start of the oscillation, is different in inclination against the zero axis from the portion 320 which occurs only half a cycle after the start of the oscillation. This problem can be neglected in practical use, so long as the damping of the oscillation is not very significant. The experiments also have verified that this is generally negligible.

However, a more improved and elaborate sweep system which produces a pair of sweep voltages of strictly identical inclination in mutually opposed phase, can be provided in the following manner. It will be noted that the amplitude of the sinusoidal voltage ($e_2$) generated in the circuit 210 is smaller than that ($e_3$) from the circuit 220 in a cycle at any selected time, because the former wave is 180° ahead of the latter while the waves are ever attenuating. Further, the inclination of a zero crossing portion of the sinusoidal wave is determined uniquely by the amplitude of the wave, if the angular frequency of the wave is the same. This relation is represented by the following formula.

$$E = A \sin \omega t \;\; \dot{}\, A\omega t \;\therefore E/t = A\omega \quad (3)$$

It will be seen from the above formula that the same inclination, i.e. the same rate of voltage rise or fall at the zero crossing point, is obtained by selecting the values of amplitude A and angular frequency $\omega$ so that the product $A\omega$ is the same. Either amplitude or frequency, or both of them may be adjustable to maintain the required inclination, though the simplest way is no doubt to adjust the amplitude. For example, in FIG. 3, the voltage inclinations 310 and 320 can be made identical by adjusting the amplitude $|e_2|$ and $|e_3|$ to be equal.

For this purpose, the current normally supplied to the coil 215 is made slightly larger than the normal current of the coil 225. The required increase in the current is determined as follows:

From the previously mentioned Formula 2, $$e_2 = -L_o\omega_o I\cdot \exp\left(-\frac{\pi}{4Q}\right)\sin\frac{\pi}{2}\sqrt{1-\frac{1}{4Q^2}}$$

$$e_3 = -L_o\omega_o I_o\cdot \exp\left(-\frac{3\pi}{4Q}\right)\sin\frac{3\pi}{2}\sqrt{1-\frac{1}{4Q^2}}$$

where I and $I_o$ indicate the current of coil 215 and 225 respectively.

Assuming $$\frac{1}{2Q} < \frac{\pi}{2Q} \ll 1$$

In order to be $$|e_2| = |e_3|$$

$$I = I_o\left(1+\frac{\pi}{2Q}\right) \qquad (4)$$

That is, the current of the coil 215 is required to be larger than that of coil 225 by $$\frac{\pi}{2Q} I_o$$

A simple way to attain the above adjustment is explained with reference to FIG. 2. The voltage of the source 226 is made slightly lower than that of the source 216, while the internal ressitance of each vacuum tube is maintained unvaried, and a step voltage of the same amplitude is applied to the grid 212 or 222 of each vacuum tube. An alternative method is that the negative step voltage applied to the grid 222 is made slightly lower than that applied to the grid 212 to decrease the current correspondingly, while the voltages of the sources 216 and 226 are the same. If a pentode is used for each of the vacuum tubes 212 and 222, said adjustment may be done by adjusting the potential of the second grid. Any other known technique can be utilized for this purpose without difficulty.

Another embodiment of this invention will be described hereunder. The system of this embodiment can be used for the horizontal sweep in a CRT whose vertical frequency band width is up to several thousands MC band. The previous embodiment shown in FIG. 2 is not suitable for the operation in such higher frequency band, because the cathode 213 (or 223) of the vacuum tube has considerable amount of stray capacitance. That is, comparatively large capacitance between the cathode and the heater, existing in parallel with the capacitor 214, obstructs the inherent high frequency oscillation in the resonance circuit and also limits the amplitude of generated sinusoidal voltage.

Figure 4:
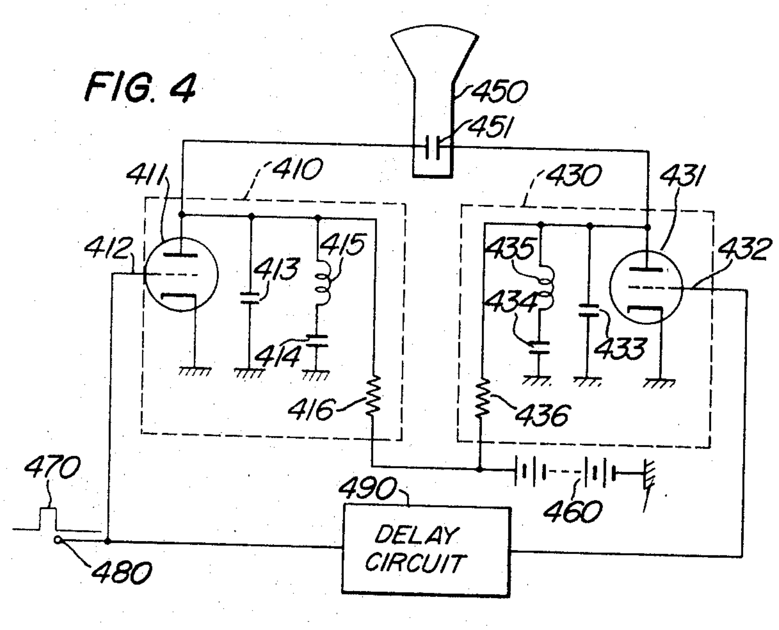
FIG. 4 is a connection diagram of another embodiment of this invention.

Referring to FIG. 4, the circuits 410 and 430 are identical in constitution and operation and are designed on the basis of the principle described already. The following explanation will be given as to the circuit 410. The vacuum tube 411 is normally non-conductive, only being conductive when a positive pulse is applied to the grid 412. The capacitors 413 and 414 are charged by the current from the source 460 through the resistance 416 up to a voltage substantially equal to the voltage of the source. The capacitor 413 is of very small capacitance, the value being several tens pf. including the stray capacitance in the anode of the vacuum tube 411, and the capacitance between the lead wires and other parasitic capacitance. Compared to this, the capacitor 414 is much larger, its capacitance being larger than several thousands pf. The resistor 416 is preferably of a high value; for instance, 5 kilo-ohm being a sufficient value.

Upon receiving a positive pulse at the grid 412, the vacuum tube 411 becomes conductive to let flow the anode current. Because of high resistance of the resistor 416, a substantial part of the anode current is supplied from the capacitors 413 and 414, first the capacitor 413 being discharged through the vacuum tube 411 and then the capacitor 414 through the coil 415 and the vacuum tube 411. Upon elimination of the pulse, the vacuum tube returns to a non-conductive state, a damped sinusoidal oscillation is caused in the resonance circuit consisting of coil 415 and capacitors 413 and 414, the initial conditions being determined by the current through the coil 415 and the difference of voltage between the capacitors 413 and 414. In this oscillating circuit, capacitor 414 does not participate in the determination of the frequency of oscillation, as its capacitance is sufficiently large as compared with that of the capacitor 413, and the resonance frequency is determined by the coil 415 and the capacitor 413.

The positive pulse 470 is applied to the grid 412 of the vacuum tube 411 directly, and to the grid 432 of the vacuum tube 431 through the delay circuit 490. The delay time is adjusted so that the difference in phase of the sinusoidal voltage between the circuit 410 and 430 is 180° or a half cycle.

By way of example, the circuit constants to give a sweep rate of 0.1 ns./cm. for a CRT whose horizontal sensitivity is 30 v./cm., are shown as follows:

Capacitors 413 and 433: 15 pf. each
Capacitors 414 and 434: 5000 pf. or above, each
Coils 415 and 435: 3.5 $\mu$h.
Resistors 416 and 436: 11K ohm, each
Voltage of source 460: 1,400 v.
Pulse width of pulse 470: 24 ns.
Type of vacuum tube: 2B94
Output frequency: 22 mc.
Amplitude of output: 2,120 v. p-p It may be pointed out that the circuits 410 and 430 interfere with each other, as the two circuits are electrically coupled through the horizontal deflecting plates 451. Therefore, strictly speaking, the characteristics such as the resonance frequency and the amplitude are not the same as determined in each circuit which is not connected to the deflecting plate. However, the interference is generally negligible, as the stray capacitance in the deflecting plates is of very small value, for example being less than several pf.

Figure 5A:
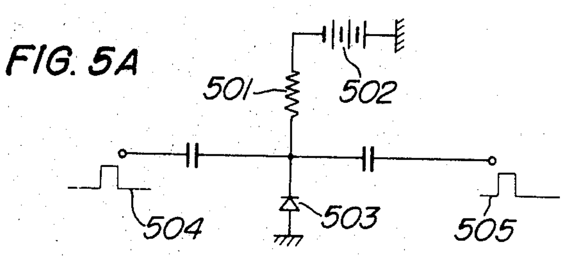
FIG. 5A is a connection diagram of an embodiment of the delay circuit used in this invention.

FIG. 5A shows an embodiment of the delay circuit. As mentioned before, the delay circuit may be a known monostable multi-vibrator or a co-axial line. However, a simple and convenient circuit is provided by the use of the step Recovery Diode (hereinafter, referred to SRD). This type of delay circuit is provided also with a self-shaping function.

Figure 5B:
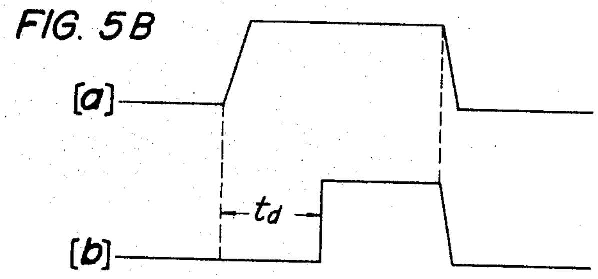
FIG. 5B is a diagram showing the operation of the delay circuit shown in FIG. 5A.

The time required to make an SRD non-conductive is determined by the electric charge accumulated on the junction boundary of the SRD. Accordingly, the delay time can be controlled by adjusting the forward current. In FIG. 5A, a current determined by the resistor 501 is supplied to SRD 503 from the source 502. If a positive pulse 504 is applied to make SRD 503 non-conductive, the SRD remains conductive for a period proportional to the electric charge stored in the junction boundary of the SRD, and then suddenly becomes non-conductive. FIG. 5B shows the timing relation of the input pulse (*a*) and the output pulse (*b*), the delay time being indicated by $t_d$. The delay time can be adjusted by varying the resistor 501 so that the difference in phase of the sinusoidal voltage between the circuit 410 and 430 in FIG. 4 is a half cycle or 180°.

Corresponding to the extremely high frequency sweep voltage involved in the ultra high-speed sweep by the sinusoidal signal, the required delay time is very limited, thereby making the adjustment of the delay time considerably difficult. However, with the delay circuit comprising SRD, the delay time is easily adjustable by controlling the resistor, and further, a self-shaping function is provided. The discussion made in connection to FIG. 2 applies also to this circuit arrangement. In order to give strictly the same voltage inclination to each of the deflecting plates of the CRT in FIG. 4, the product of amplitude and angular frequency of the sinusoidal oscillation must be exactly the same about each of the resonance circuits. As mentioned previously, in order to make the product identical by adjusting the amplitude, it is only required that the initial currents through the coils fulfill the requirement represented by the Formula 4. This may be realized by varying the pulse amplitude applied to each grid. Or, in an alternative embodiment, two separate sources may be connected between the respective resistances 416, 436 and the ground, the voltages of the sources being adjusted so as to satisfy the relation of Formula 3. (This circuit constitution is not shown.)

In some application, it is preferable for adjusting to vary not only the current but also the frequency. For this purpose, a variable inductance coil or a variable capacitor may be used in either one or both of the resonance circuits, as can easily be seen.

In the above description, this invention has been explained with embodiments of a very simple circuit. However, it will be understood that the same principle is readily applicable to more elaborate and complicated sweep circuits, likewise to provide a pair of sweep voltage which are of the same inclination and reverse in the phase.

Therefore, according to this invention there is provided sinusoidal time base systems characterized in that said system comprises two sets of sinusoidal sweep voltage generators, each set of said generator including at least a coil and a capacitor for generating a damping sinusoidal oscillation in response to a trigger signal which is in a fixed timing relation to the signal to be observed by the cathode ray tube, a portion of said damping sinusoidal oscillation being used as the sweep voltage, and the output of each set of said sinusoidal sweep signal generator being connected to each of the deflecting plates of said cathode ray tube, and that said trigger signal is applied to each of said sweep signal generator with a different and predetermined timing so that the output sinusoidal signals from said sweep signal generators are mutually opposed in phase. It will be understood that said two sweep signal generators need not to be of the same circuit constitution, so far as they impart sinusoidal signals of required frequencies in mutually opposed phase. Further, it will be obvious that the system of this invention requires no phase inverter circuit in the output of the sweep signal generator.

Moreover, the adjustment of the phase of the sweep voltage is very easy with this system, because an independent sweep generator is connected to each of the deflecting plates.

It will be further noted that according to this invention, the phase of the sweep signal can be shifted simply by controlling the timing of the trigger signal, which controlling also can be realized in a simple manner using a simple delay circuit.

Finally, it should be pointed out that according to this invention, two times the potential gradient is obtained between deflecting plates, compared with that in a system where a sweep voltage is applied to one of the deflecting plate and the other is connected to the ground, and then the time base sweep speed on the CRT screen is two times as high, when the same generator is generating the sinusoidal time base voltage with the same frequency and the same amplitude.

What we claim is:

1. Sinusoidal time base systems characterized in that said system comprises two sets of sinusoidal sweep voltage generators, each set of said generator including at least a coil and a capacitor for generating a damped sinusoidal oscillation in response to a trigger signal which is in a fixed timing relation to the signal to be observed by the cathode ray tube, a portion of said damped sinusoidal oscillation being used as the sweep voltage, and the output of each set of said sinusoidal sweep voltage generator being connected to the deflecting plates of said cathode ray tube, and that said trigger signal is applied to each of said sweep signal generator with a different and predetermined timing so that the output sinusoidal voltage from said sweep voltage generators are mutually opposed in the phase.

2. Sinusoidal time base systems as defined in claim 1, characterized in that the product of the angular frequency and amplitude of said damped sinusoidal oscillation is adjusted to a fixed value, thus to equalize the voltage inclinations of said sweep voltages from said two sets of sinusoidal sweep voltage generators.

3. Sinusoidal time base systems as defined in claim 1, characterized in that the current in said coil is adjusted to a fixed value, thus to equalize the voltage inclinations of said sweep voltages from said two sets of sinusoidal sweep signal generators.

4. Sinusoidal time axis sweep systems as defined in claim 1, characterized in that said sinusoidal sweep voltage generator further comprises a normally-conductive switching element which is connected in series between a source and said coil and capacitor, said coil and capacitor being connected in parallel, and that said damped sinusoidal oscillation is generated by turning said switching element to nonconductive in a timing related to said signal to be observed.

5. Sinusoidal time base systems as defined in claim 1, characterized in that each set of said sinusoidal sweep voltage generator comprises a coil and a first capacitor of comparatively large capacitance connected in series to said coil, a second capacitor whose capacitance is outstandingly small as compared with said first capacitor and which is connected across the series-connected circuit of said coil and first capacitor, and a normally-nonconductive switching element connected in parallel to said second capacitor, a power source being connected to the thus composed parallel circuit, and that said damped sinusoidal oscillation is initiated by said switching element's being caused to be conductive for a short period.

6. Sinusoidal time base systems as defined in claim 1, characterized in that said timing with which said trigger signal is applied at different time is provded by a delay circuit.

7. Sinusoidal time base systems as defined in claim 6, in which said delay circuit comprises a delay line.

8. Sinusoidal time base systems as defined in claim 6, in which said delay circuit is a monostable circuit.

9. Sinusoidal time base systems as defined in claim 6, in which said delay circuit comprises a step recovery diode.

References Cited

UNITED STATES PATENTS

| | | | |
|---|---|---|---|
| 2,553,752 | 5/1951 | De Lange | 331—166 X |
| 3,324,413 | 6/1967 | Konno et al. | 331—166 |

RODNEY D. BENNETT, Jr., *Primary Examiner.*

T. H. TUBBESING, *Assistant Examiner.*

U.S. Cl. X.R.

315—29; 331—166